(12) United States Patent
Gencaslan et al.

(10) Patent No.: US 10,974,773 B2
(45) Date of Patent: Apr. 13, 2021

(54) AIR RESISTANCE-REDUCING DEVICE FOR A VEHICLE

(71) Applicant: WABCO Europe BVBA, Brussels (BE)

(72) Inventors: Umut Gencaslan, Hannover (DE); Gandert Marcel Rita Van Raemdonck, PW Delf (NL)

(73) Assignee: WABCO Europe BVBA, Brussels (BE)

( * ) Notice: Subject to any disclaimer, the term of this patent is extended or adjusted under 35 U.S.C. 154(b) by 176 days.

(21) Appl. No.: 16/330,939

(22) PCT Filed: Jul. 21, 2017

(86) PCT No.: PCT/EP2017/000891
§ 371 (c)(1),
(2) Date: Mar. 6, 2019

(87) PCT Pub. No.: WO2018/050266
PCT Pub. Date: Mar. 22, 2018

(65) Prior Publication Data
US 2019/0233024 A1 Aug. 1, 2019

(30) Foreign Application Priority Data
Sep. 15, 2016 (DE) .................. 10 2016 011 094.5

(51) Int. Cl.
*B62D 35/00* (2006.01)
*B62D 37/02* (2006.01)

(52) U.S. Cl.
CPC ......... *B62D 35/007* (2013.01); *B62D 35/001* (2013.01); *B62D 37/02* (2013.01)

(58) Field of Classification Search
CPC ..... B62D 35/007; B62D 37/02; B62D 35/001
(Continued)

(56) References Cited

U.S. PATENT DOCUMENTS

| 6,666,498 B1 | 12/2003 | Whitten |
| 7,976,096 B2 | 7/2011 | Holubar |

(Continued)

FOREIGN PATENT DOCUMENTS

| DE | 10228658 A1 | 1/2004 |
| DE | 202009014476 U1 | 2/2010 |

(Continued)

OTHER PUBLICATIONS

European Patent Office, Rijswijk, Netherlands, International Search Report of International Application No. PCT/EP2017/000891, dated Oct. 27, 2017, 3 pages.

*Primary Examiner* — Pinel E Romain
(74) *Attorney, Agent, or Firm* — Dickinson Wright PLLC

(57) ABSTRACT

An air resistance-reducing device (1) for a vehicle (12) includes a first air guide element A (3) and a second air guide element B (4) which can be adjusted between a rest position and a travel position for contour extension and aerodynamic air guidance by an actuator (6). The air resistance-reducing device (1) includes connecting element (7) with a coupling element 8, which connects the actuator (6) to the at least one connecting element (7), a first leg (9), which connects the coupling element (8) to the first air guide element A (3), a second leg (10), which connects the coupling element (8) to the second air guide element B (4), and a third leg (11), which connects the first leg (9) to the second leg (10).

10 Claims, 1 Drawing Sheet

(58) Field of Classification Search
USPC .......................................... 296/180.2, 180.3
See application file for complete search history.

(56) References Cited

U.S. PATENT DOCUMENTS

| | | | |
|---|---|---|---|
| 9,145,177 B2 | 9/2015 | Smith et al. | |
| 2010/0106380 A1 | 4/2010 | Salari et al. | |
| 2014/0019010 A1* | 1/2014 | Smith | B62D 35/004 |
| | | | 701/49 |
| 2016/0077529 A1* | 3/2016 | Smith | G05D 3/00 |
| | | | 701/49 |
| 2017/0355403 A1* | 12/2017 | Grebel | B62D 35/005 |
| 2018/0001941 A1* | 1/2018 | Polidori | B62D 35/007 |
| 2018/0043943 A1* | 2/2018 | Polidori | B62D 35/001 |

FOREIGN PATENT DOCUMENTS

| | | |
|---|---|---|
| DE | 102013011169 A1 | 1/2015 |
| WO | 2013063479 A1 | 5/2013 |
| WO | 2014011886 A1 | 1/2014 |
| WO | 2014121937 A1 | 8/2014 |

\* cited by examiner

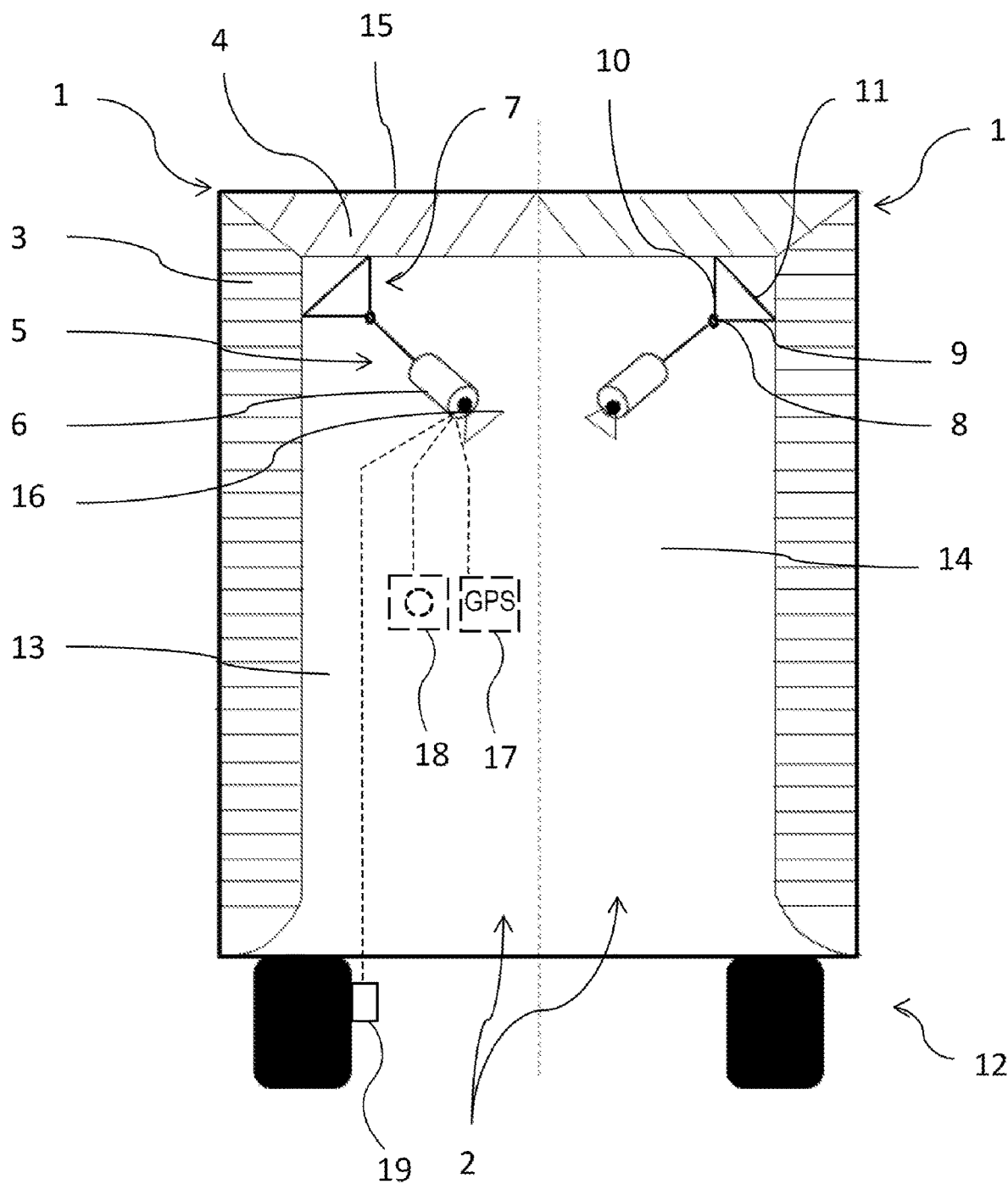

AIR RESISTANCE-REDUCING DEVICE FOR A VEHICLE

TECHNICAL FIELD

The present disclosure concerns an air resistance-reducing device for a vehicle. The air resistance-reducing device comprises at least one first air guide element A (3) and at least one second air guide element B (4), which can be adjusted between a rest position and a travel position for contour extension and aerodynamic air guidance. The air resistance-reducing device furthermore comprises an actuator (6) which adjusts the first air guide element A (3) and the second air guide element B (4) between a rest position and a travel position.

BACKGROUND

Air resistance-reducing devices for vehicles have been known for a long time. Thus DE 20 2009 014 476 U1 discloses a rear spoiler device with a pivotable supporting structure. The air flow deflection body or air guide element is here moved so far away that there is no obstruction to opening the door at the rear end of the vehicle.

DE 102 28 658 A1 discloses rear spoilers in which planar surfaces which are pivotable via a hinge in the travel region allow aerodynamic optimization.

U.S. Pat. No. 7,976,096 B2 also discloses a device for reducing air resistance in vehicles. The rear spoiler is attached to the rear doors of the vehicle by means of hinges and spring elements. The air guide faces of the rear spoiler are opened and closed mechanically.

Such air resistance-reducing devices with connections in the hinge region are generally very complex since only special hinge devices or hinge structures may be used.

Furthermore, a rear spoiler device with a four-link coupling for adjusting the air guide element between a base position and a travel position is known from DE 10 2013 011 169 A1.

In addition, U.S. Pat. No. 9,145,177 B2 discloses an automatic rear spoiler device which is activated by means of a speed signal.

Such air resistance-reducing devices are usually cost-intensive and complex to maintain. Because of the demands to reduce weight and costs in the automotive sector, increasingly new concepts are desired which supersede the use of known principles, such as the use of at least two actuators for adjusting the air guide elements arranged at the side and above the vehicle rear.

SUMMARY

The object of the disclosure s to provide a suitable device for reducing air resistance in vehicles which avoids complex constructions of at least two actuators for adjusting at least two independent air guide elements.

This object is achieved by providing the air resistance-reducing device with an actuator adjusting a first air guide element A and at least one second air guide element B between a rest position and a travel position. The advantage achieved lies in particular in that a supporting device has only one drive element in the form of an actuator, whereby costs and maintenance complexity are minimized. The actuator may be arranged at any position e.g. on a rear face of a vehicle, wherein via at least one connecting element, the actuator adjusts at least two air guide elements which are connected only via the connecting element. In a particularly advantageous embodiment, via a connecting element, the actuator adjusts a first air guide element A and a second air guide element B which are connected together only via the one connecting element.

The at least one connecting element preferably comprises at least one coupling element which connects the actuator to the at least one connecting element. Coupling elements may be e.g. hinge connections, screw connections, catch connections or push-fit connections, wherein the actuator is actively connected to the at least one connecting element.

Also, the at least one connecting element comprises at least one first leg which connects the coupling element to the first air guide element A. At least one second leg of the at least one connecting element connects the at least one coupling element to the at least one second air guide element B. The first and the at least one second leg of the at least one connecting element for example transmit compression and tension forces from the actuator, whereby the first and the least one second air guide element A and B of the air resistance-reducing device can be adjusted between a rest position and a travel position.

At least one third leg of the at least one connecting element connects the first leg of the at least one connecting element to the at least one second leg of the at least one connecting element. Both the first and the at least one second leg of the at least one connecting element, but also the at least one third leg of the at least one connecting element, may be formed e.g. as rod-like metal and/or plastic profiles and/or spring elements and/or wire elements, but also as rod-like metal and/or plastic profiles with at least one catch element.

A further advantage is that the first air guide element A and the at least one second air guide element B are connected only via the one connecting element, which simplifies installation of the air resistance-reducing device.

In a further advantageous embodiment, the actuator and the at least one connecting element of the air resistance-reducing device form a supporting device for supporting the first air guide element A and the at least one second air guide element B in a travel position.

It has also proved advantageous that the actuator is arranged on a substantially flat surface of the vehicle via a hinge connection, and the actuator can be pivoted into the rest position or travel position accordingly.

In a further preferred embodiment, the actuator of the supporting device of the air resistance-reducing device is configured as a linear actuator. Linear actuators have the advantage that they produce a direct translational and therefore rectilinear movement. With electric motors however, the rotational movements are converted into translational movements by means of gear mechanisms. Thus linear actuators have fewer friction-inducing components and are therefore easier to maintain than electric motors. It is also conceivable to use a pneumatic actuator or an electronic actuator for a supporting device of the air resistance-reducing device.

The air resistance-reducing device has the advantage that it can be arranged at a plurality of locations on a vehicle insofar as there is a substantially flat surface on the vehicle. Thus the air resistance-reducing device may be arranged for example on a rear face of a driver's cab, a truck, a semitrailer or a trailer. It is also conceivable to arrange the air resistance-reducing device as a roof spoiler on a driver's cab, or on side surfaces of e.g. a trailer, a semitrailer, a truck or a car.

The air resistance-reducing device may be activated in that the air resistance-reducing device can be adjusted between a rest position and a travel position preferably depending on the vehicle speed or at the driver's request. The vehicle speed may be determined by means of rotation speed sensors on the vehicle, wherein additionally, speed thresholds may be defined at which the air resistance-reducing device assumes a rest position or a travel position by means of the supporting device of the air resistance-reducing device. Also, advantageously, the driver of the vehicle may set the air resistance-reducing device between a rest position or a travel position by means of an actuation device on the vehicle, preferably in the driver's cab of the vehicle. A predictive setting of the air resistance-reducing device is also conceivable via a global position determination system known as a GPS system. Depending on speed, traffic, road surface or height profile, or a combination thereof, in this way an effective and fuel-saving adjustment of the air resistance-reducing device may take place.

In a further advantageous refinement, the first air guide element A of the air resistance-reducing device is arranged vertically, in particular on the left or right side edge of the substantially flat surface of the vehicle, and the second air guide element B of the air resistance-reducing device is arranged horizontally, in particular on the roof edge or at the lower edge, facing in the direction of the road surface, of the substantially flat surface of a vehicle. In the travel position, the first air guide element A and the second air guide element B are angled relative to the side surface or roof surface of the vehicle. The supporting device is advantageously arranged on the substantially flat surface of a vehicle, in the region of the side of the first and second air guide elements A and B facing away from the air flow, i.e. in the lee of the vehicle.

In a further advantageous embodiment, the first guide element A and the second air guide element B can be adjusted from a rest position to a travel position and from a travel position to a rest position via exclusively one actuator.

The actuator thus replaces the process known from the prior art of returning the first air guide element A and the second air guide element from a travel position to a rest position by means of a further return device, whereby advantageously the number of parts and hence the associated costs are reduced.

In a further advantageous embodiment, the first air guide element A and the second air guide element B have no direct connection. The air guide elements A and B are connected together exclusively via the connecting element.

BRIEF DESCRIPTION OF THE DRAWING

In the drawing, the only FIGURE illustrates, in a diagrammatic rear view, an exemplary embodiment of the invention which is particularly suitable for a rear surface of a vehicle.

DETAILED DESCRIPTION OF THE DRAWING

The drawing shows a rear view of a vehicle 12, in particular a truck 12 with a roof 15, a substantially flat surface 2 which in this exemplary embodiment represents a vehicle door 13 on the left in the direction of travel, and a vehicle door 14 on the right in the direction of travel. An air resistance-reducing device 1 is arranged on each of the left rear door 13 and the right rear door 14. Since the air resistance-reducing device 1 is arranged on both the left and the right rear door 13; 14 of the truck 12, the description below refers as an example only to the air resistance-reducing device 1 for the left rear door 13.

The air resistance-reducing device 1 has a first air guide element A 3 which is arranged vertically at the side on the left rear door 13. A second air guide element B 4 is arranged horizontally on the roof 15 of the truck 12. The first and second air guide elements A and B 3; 4 are connected only via the connecting element 7 and may be adjusted from a retracted rest position to an extended travel position. The movement tracks of the first and second air guide elements A and B 3; 4 are here orthogonal to each other. The two independent air guide elements A and B 3; 4 are adjusted by means of a supporting device 5 which comprises an actuator 6 and a connecting element 7. The connecting element 7 includes a coupling element 8 which connects the actuator 6 to the at least one connecting element 7, a first leg 9 which connects the coupling element 8 to the first air guide element A 3, a second leg 10 which connects the coupling element 8 to the second air guide element B 4, and a third leg 11 which connects the first leg 9 to the second leg (10). The actuator 6 is arranged so as to be movable via a hinge connection 16, whereby the actuator is pivoted out depending on the desired position of the air resistance-reducing device 1.

The air resistance-reducing device 1 is adjusted between a rest position and a travel position firstly via a GPS system 17. Here, depending on vehicle and/or travel speed and/or height profile and/or weather, the first and the second air guide elements A and B 3; 4 of the air resistance-reducing device 1 are adjusted into an aerodynamically suitable position. In addition, the air resistance-reducing device 1 may be adjusted at the request of the driver. For this, an actuation device is provided in the form of a pushbutton 18 in the driver's cab. Depending on the position of the pushbutton, the independent air guide elements A and B 3; 4 are moved into a position between a rest position or a travel position. In addition, the air resistance-reducing device 1 is adjusted between a rest position and a travel position via a rotation speed sensor 19 fitted to the vehicle.

While the above description constitutes the preferred embodiments of the present invention, it will be appreciated that the invention is susceptible to modification, variation and change without departing from the proper scope and fair meaning of the accompanying claims.

LIST OF REFERENCE SIGNS (PART OF DESCRIPTION)

1 Air resistance-reducing device
2 Substantially flat surface
3 First independent air guide element A
4 Second independent air guide element B
5 Support device
6 Actuator
7 Connecting element
8 Coupling element
9 First leg
10 Second leg
11 Third leg
12 Vehicle
13 Left rear door
14 Right rear door
15 Roof
16 Hinge connection
17 GPS system
18 Driver pushbutton
19 rotation speed sensor

The invention claimed is:
1. An air resistance-reducing device (1) for a vehicle (12), the air resistance-reducing device (1) comprising:
a first air guide element A (3);

a second air guide element B (4);

an actuator (6) configured for jointly adjusting both the first air guide element A (3) and the second air guide element B (4) between a rest position and a travel position; and a connecting element (7) including:

a coupling element (8) which connects the actuator (6) to the at least one connecting element (7);

a first leg (9) which connects the coupling element (8) to the first air guide element A (3);

a second leg (10) which connects the coupling element (8) to the second air guide element B (4); and a third leg (11) which connects the first leg (9) to the second leg (10).

2. The air resistance-reducing device (1) as claimed in claim 1, wherein the first air guide element A (3) and the second air guide element B (4) are connected together only via the connecting element (7).

3. The air resistance-reducing device (1) as claimed in claim 1, wherein the actuator (6) and the connecting element (7) form a supporting device (5).

4. The air resistance-reducing device (1) as claimed in claim 1, wherein the actuator (6) is arranged on a substantially flat surface (2) of the vehicle (12) via a hinge connection (16).

5. The air resistance-reducing device (1) as claimed in claim 1, wherein the actuator (6) of the support device (9) is a linear actuator, a pneumatic actuator or an electronic actuator.

6. The air resistance-reducing device (1) as claimed in claim 1, wherein the air resistance-reducing device (1) is arranged on a rear face (2) of a driver's cab, a truck, a semitrailer or a trailer.

7. The air resistance-reducing device (1) as claimed in claim 1, wherein the air resistance-reducing device (1) can be adjusted between the rest position and the travel position depending on the speed of the vehicle (2) via at least one of a rotation speed sensor (19), a driver request (18), and an input from a global position determination device (17).

8. The air resistance-reducing device (1) as claimed in claim 1, wherein the first air guide element A (3) is arranged vertically on a substantially flat surface (2) of the vehicle (12), and the second air guide element B (4) is arranged horizontally on the substantially flat surface (2) of a vehicle (12).

9. The air resistance-reducing device (1) as claimed in claim 1, wherein the actuator is configured to adjust the first air guide element A (3) and the second air guide element B (4) both from the rest position into the travel position and from the travel position into the rest position via the actuator (6).

10. The air resistance-reducing device (1) as claimed in claim 1, wherein the first air guide element A (3) and the second air guide element B (4) have no direct connection.

* * * * *